United States Patent
Lee

(10) Patent No.: US 12,115,833 B2
(45) Date of Patent: Oct. 15, 2024

(54) COOLING SYSTEM FOR ELECTRIC VEHICLES

(71) Applicants: Hyundai Motor Company, Seoul (KR); Kia Corporation, Seoul (KR)

(72) Inventor: Gun Goo Lee, Suwon-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 246 days.

(21) Appl. No.: 17/738,991

(22) Filed: May 6, 2022

(65) Prior Publication Data

US 2022/0410655 A1  Dec. 29, 2022

(30) Foreign Application Priority Data

Jun. 29, 2021 (KR) .......... 10-2021-0085136

(51) Int. Cl.
  *F28F 19/00* (2006.01)
  *B60H 1/00* (2006.01)
  *B60K 11/04* (2006.01)
  *B60L 58/26* (2019.01)

(52) U.S. Cl.
  CPC .......... *B60H 1/00278* (2013.01); *B60K 11/04* (2013.01); *B60L 58/26* (2019.02)

(58) Field of Classification Search
  CPC ...... B60H 1/00278; B60L 58/26; B60K 11/04
  USPC .......................................................... 165/41
  See application file for complete search history.

(56) References Cited

U.S. PATENT DOCUMENTS

| 8,336,319 B2 | 12/2012 | Johnston et al. |
| 8,402,776 B2 | 3/2013 | Johnston et al. |
| 2018/0050585 A1* | 2/2018 | Seike ............. F04B 49/065 |

FOREIGN PATENT DOCUMENTS

JP    2013536118 A  *  9/2013

\* cited by examiner

*Primary Examiner* — Davis D Hwu
(74) *Attorney, Agent, or Firm* — Morgan, Lewis & Bockius LLP

(57) ABSTRACT

A cooling system for electric vehicles, which enables air to be efficiently removed from a cooling circuit due to optimal placement of a reservoir tank, includes a first cooling circuit configured to cool a battery by coolant that circulates in accordance with operation of a first circulation pump and exchanges heat with a first heat exchange module, a second cooling circuit configured to cool a PE module using coolant that circulates in accordance with operation of a second circulation pump and exchanges heat with a second heat exchange module, the second cooling circuit being configured so that the coolant in the first cooling circuit circulates through the second cooling circuit, and a reservoir tank, which is continuously connected to the first and second cooling circuits to remove air in the coolant flowing through each of the first and second cooling circuits in the reservoir tank.

11 Claims, 2 Drawing Sheets

COOLING SYSTEM FOR ELECTRIC VEHICLES

CROSS-REFERENCE TO THE RELATED APPLICATION

The present application claims priority to Korean Patent Application No. 10-2021-0085136, filed on Jun. 29, 2021, the entire contents of which is incorporated herein for all purposes by this reference.

BACKGROUND OF THE PRESENT DISCLOSURE

Field of the Present Disclosure

The present disclosure relates to a cooling system for electric vehicles (EVs), which enables air to be efficiently removed from a cooling circuit due to optimal placement of a reservoir tank.

Description of Related Art

Recent issues, such as environmental problems and high oil prices, have led to significantly increased interest in environmentally friendly vehicles such as electric vehicles.

In such environmentally friendly vehicles, a high-voltage battery is one of the key components that make up the electric vehicle, and management of the temperature of the battery is essential to improve the performance and efficiency of the battery, because high-temperature heat is generated during charging and discharging.

A power electronic (PE) module including a motor is also provided as a driving source, and it is necessary to cool the PE module, because heat is generated during the operation of the PE module.

Accordingly, a cooling circuit for cooling the battery and a cooling circuit for cooling the PE module are provided, and coolant circulates in the cooling circuits to cool the battery and the PE module.

Furthermore, a reservoir tank is provided in at least one of the cooling circuits to enable air bubbles to be removed from the coolant in a process of coolant circulation.

However, because the reservoir tank is provided only in the cooling circuit for cooling the PE module, the air bubbles are removed from the cooling circuit for cooling the battery only in the mode in which coolant circulates in the cooling circuit for cooling the battery integrated with the cooling circuit for cooling the PE module, but the air bubbles may not be removed from the cooling circuit for cooling the battery in the mode in which coolant circulates in the cooling circuit for cooling the battery isolated from the cooling circuit for cooling the PE module.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a cooling system for electric vehicles, which enables air to be efficiently removed from a cooling circuit due to optimal placement of a reservoir tank.

In accordance with an aspect of the present disclosure, the above and other objects may be accomplished by the provision of a cooling system for electric vehicles, which includes a first cooling circuit configured to cool a battery by coolant that circulates in accordance with operation of a first circulation pump and exchanges heat with a first heat exchange module, a second cooling circuit configured to cool a PE module using coolant that circulates in accordance with operation of a second circulation pump and exchanges heat with a second heat exchange module, the second cooling circuit being configured so that the coolant in the first cooling circuit circulates through the second cooling circuit, and a reservoir tank, which is continuously connected to the first and second cooling circuits to remove air in the coolant flowing through each of the first and second cooling circuits in the reservoir tank.

The reservoir tank may be connected between the first cooling circuit and the second cooling circuit.

A first parallel circulation passage may be connected between a rear end portion of the first heat exchange module and a front end portion of the first circulation pump, a second parallel circulation passage may be connected between a rear end portion of the second heat exchange module and a front end portion of the second circulation pump, a series circulation passage may be connected between the first parallel circulation passage and the second parallel circulation passage, and the reservoir tank may be disposed on the series circulation passage.

The series circulation passage may include a first series circulation passage connected from a front end portion of the first parallel circulation passage to a rear end portion of the second parallel circulation passage, and a second series circulation passage connected from a front end portion of the second parallel circulation passage to a rear end portion of the first parallel circulation passage. The reservoir tank may be disposed on the first series circulation passage.

The cooling system may further include a mode-switching valve provided at a point where the coolant in the second cooling circuit is branched into the second parallel circulation passage and the series circulation passage for switching a direction of flow of the coolant, and a controller configured to implement an independent cooling mode in which the coolant circulates independently in each of the first and second cooling circuits and an integrated cooling mode in which the coolant circulates in both the first and second cooling circuits by switching the mode-switching valve in accordance with the outside air temperature and the battery temperature.

When the outside air temperature and the battery temperature are equal to or greater than a predetermined temperature, the mode-switching valve may open the second parallel circulation passage and close the series circulation passage to implement the independent cooling mode.

When the outside air temperature is less than a predetermined temperature and the outside air temperature is less than the battery temperature, the mode-switching valve may close the second parallel circulation passage and open the series circulation passage to implement the integrated cooling mode.

In the first cooling circuit, the first circulation pump, the battery, and a plurality of first heat exchange modules may be arranged in series.

In the second cooling circuit, the second circulation pump and the PE module may be arranged in series, and a plurality of second heat exchange modules may be arranged in parallel at a rear end portion of the PE module.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
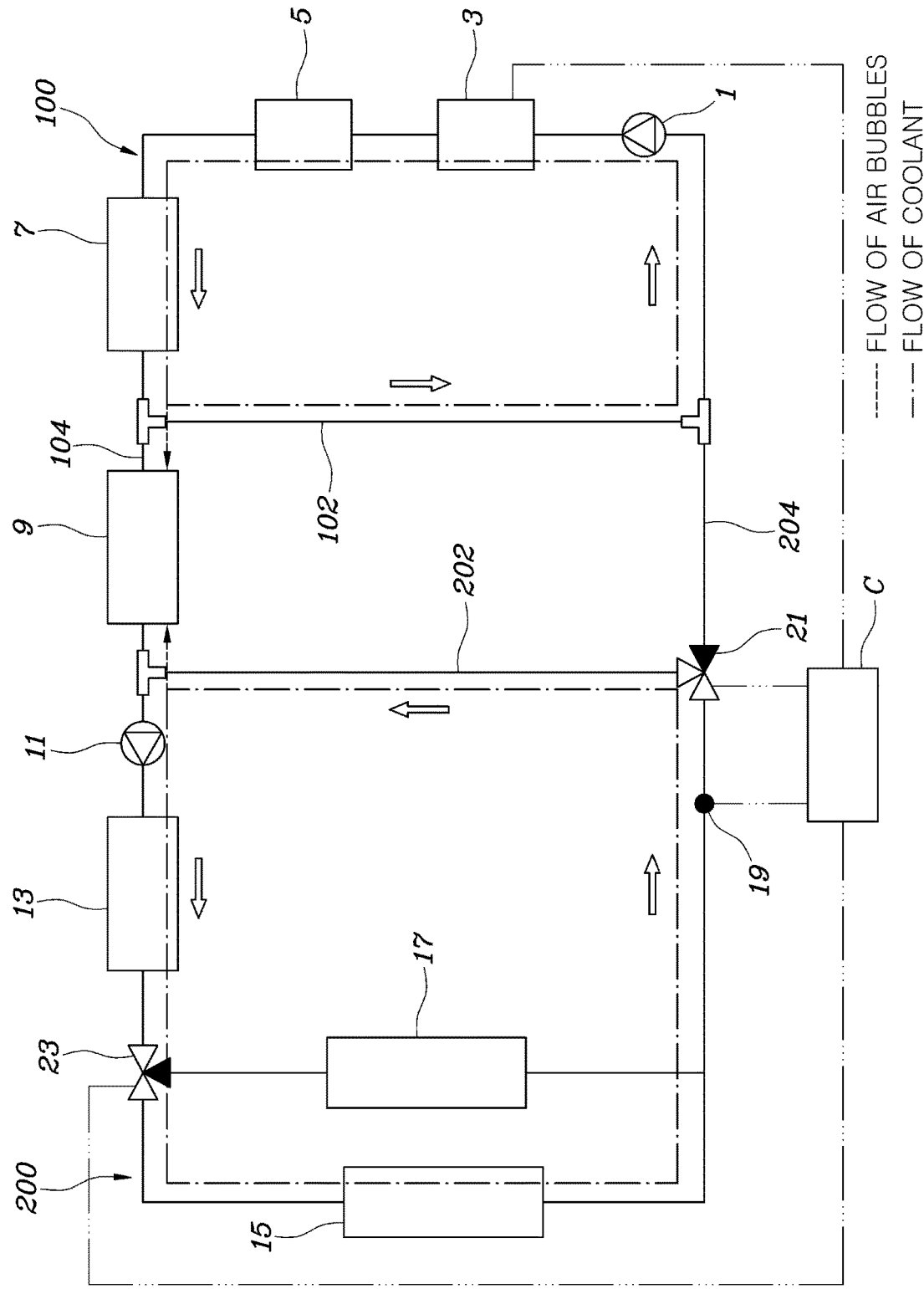
FIG. 1 is a diagram illustrating a flow of coolant in an independent cooling mode of first and second cooling circuits in a cooling system for electric vehicles according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The specific structural and functional descriptions included in the specification or application are merely illustrated for describing embodiments of the present disclosure. The present disclosure may be embodied in different forms, and should not be construed as being limited to the embodiments set forth herein.

The present disclosure may be subjected to various modifications and may have various forms, and specific embodiments will be illustrated in the drawings and described in detail herein. However, this is not intended to limit the present disclosure to a specific embodiment. It should be understood that the present disclosure includes all modifications, equivalents or replacements that fall within the spirit and technical scope thereof.

Terms such as "first" and/or "second" may be used to describe various elements of the present disclosure, but these elements should not be construed as being limited by the terms. In other words, such terms will be used only for differentiating one element from other elements of the present disclosure. For example, without departing from the scope and spirit of the present disclosure, a first element may be referred to as a second element, and similarly, a second element may also be referred to as a first element.

It will be understood that when an element is referred to as being "coupled" or "connected" to another element, it can be directly coupled or connected to the other element, or intervening elements may also be present. On the other hand, it will be understood that when an element is referred to as being "directly coupled" or "directly connected" to another element, no intervening elements are present. Other expressions for describing relationships between elements, for example, "between" and "immediately between" or "neighboring" and "directly neighboring" may also be interpreted likewise.

The terminology used herein is for describing various exemplary embodiments only and is not intended to limit the present disclosure. As used herein, the singular forms "a", "an" and "the" are intended to include the plural forms as well, unless the context clearly indicates otherwise. It will be further understood that the terms "comprises/includes" and/or "comprising/including", when used in the specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms, including technical and scientific terms, used herein have the same meaning as those commonly understood by one of ordinary skill in the art. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

Various exemplary embodiments of the present disclosure will be described in detail with reference to the accompanying drawings.

Figure 2:
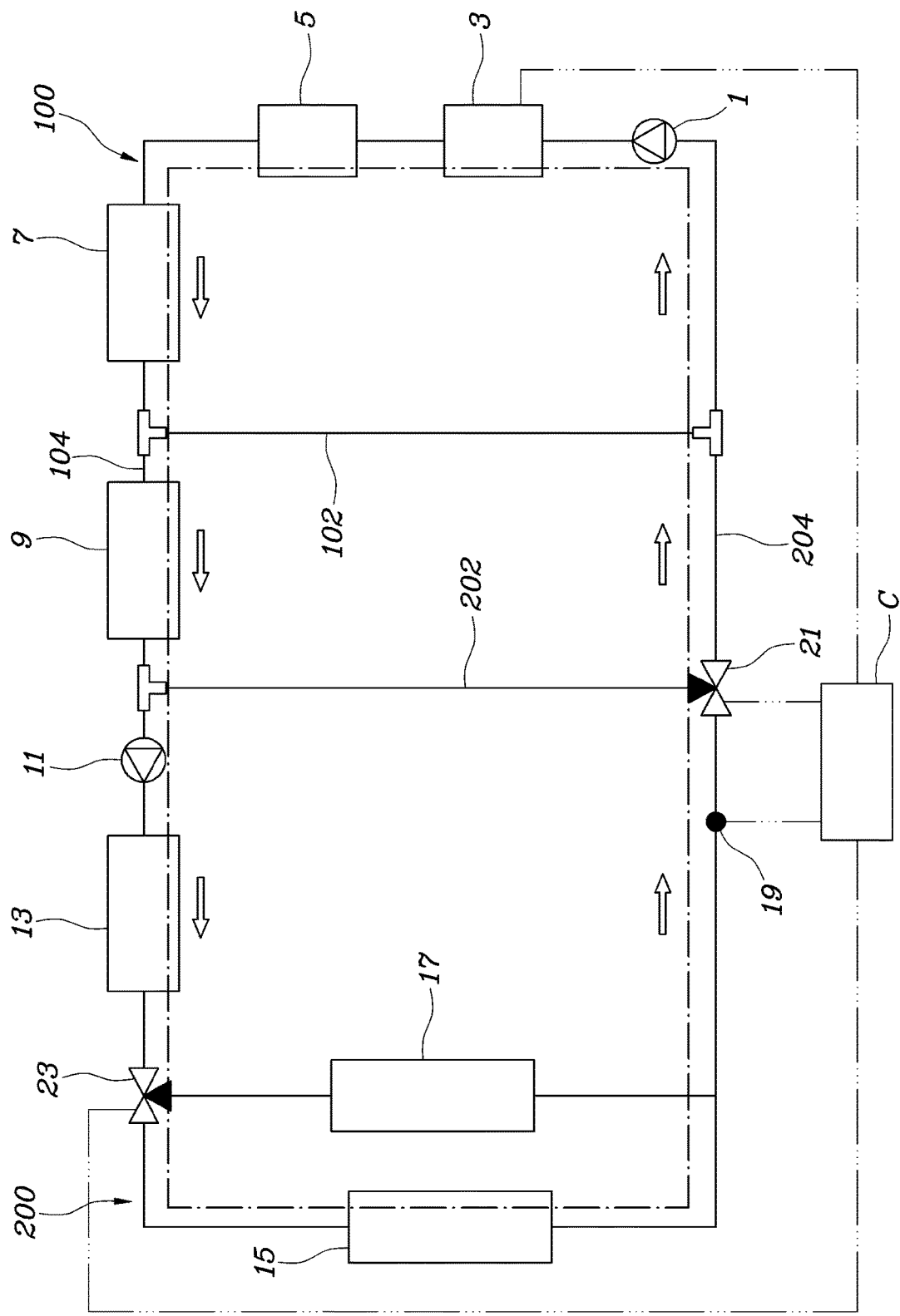
FIG. 2 is a diagram illustrating a flow of coolant in an integrated cooling mode of the first and second cooling circuits in the cooling system for electric vehicles according to an exemplary embodiment of the present disclosure.

FIG. 1 is a diagram illustrating a flow of coolant in an independent cooling mode of first and second cooling circuits 100 and 200 in a cooling system for electric vehicles according to an exemplary embodiment of the present disclosure. FIG. 2 is a diagram illustrating a flow of coolant in an integrated cooling mode of the first and second cooling circuits 100 and 200 in the cooling system for electric vehicles according to an exemplary embodiment of the present disclosure.

Referring to the drawings, the cooling system for electric vehicles according to an exemplary embodiment of the present disclosure includes a first cooling circuit 100 configured to cool a battery 3 using coolant that circulates in accordance with operation of a first circulation pump 1 and exchanges heat with a first heat exchange module, a second cooling circuit 200 configured to cool a PE module 13 using coolant that circulates in accordance with operation of a second circulation pump 11 and exchanges heat with a second heat exchange module, the second cooling circuit 200 being configured so that the coolant in the first cooling circuit circulates through the second cooling circuit, and a reservoir tank 9, which is always connected to the first and second cooling circuits 100 and 200 to remove air in the coolant flowing through each of the first and second cooling circuits in the reservoir tank.

For example, each of the first and second circulation pumps 1 and 11 is an electric water pump which may be operated by a motor as necessary.

The first heat exchange module includes a heater 5 and a battery chiller 7, and the second heat exchange module includes a heat pump 17 and a radiator 15.

The first cooling circuit 100 is a cooling circuit for cooling a battery 3, and the second cooling circuit 200 is a cooling circuit for cooling a PE module 13. The first and second cooling circuits 100 and 200 are physically connected to each other.

In an integrated cooling mode as illustrated in FIG. 2, the coolant flowing through the first cooling circuit 100 and the coolant flowing through the second cooling circuit 200 circulate around a series cooling loop formed by the first and second cooling circuits 100 and 200.

On the other hand, in an independent cooling mode as illustrated in FIG. 1, the coolant flowing through the first cooling circuit 100 and the coolant flowing through the second cooling circuit 200 circulate around parallel cooling loops formed by the first and second cooling circuits 100 and 200, respectively.

The single reservoir tank 9 of the present disclosure is provided so that it is mechanically connected to the first cooling circuit 100 as well as the second cooling circuit 200.

In the integrated cooling mode, the air (air bubbles) flowing together with the coolant is removed by flowing into the reservoir tank 9 while the coolant circulates along the integrated first and second cooling circuits 100 and 200.

Moreover, in the independent cooling mode, although the coolant in the first cooling circuit 100 and the coolant in the second cooling circuit 200 circulate independently, the air flowing along the first cooling circuit 100 and the air flowing along the second cooling circuit 200 are removed by flowing into the reservoir tank 9 because the first and second cooling circuits 100 and 200 are physically connected to the reservoir tank 9.

Accordingly, the present disclosure can significantly improve air removal efficiency because air is removed at all times regardless of the cooling mode by removing air from each of the cooling circuits not only during coolant circulation in the integrated cooling mode but also during coolant circulation in the independent cooling mode.

As illustrated in the drawings, the reservoir tank 9 of the present disclosure is connected between the first cooling circuit 100 and the second cooling circuit 200.

That is, because the reservoir tank 9 is disposed on a passage connecting the first cooling circuit 100 to the second cooling circuit 200, the reservoir tank 9 is maintained in a state of being constantly connected both to the first cooling circuit 100 and to the second cooling circuit 200.

The placement of the reservoir tank 9 will be described in more detail. The present disclosure has a structure in which a first parallel circulation passage 102 is connected between the rear end portion of the first heat exchange module and the front end portion of the first circulation pump 1, a second parallel circulation passage 202 is connected between the rear end portion of the second heat exchange module and the front end portion of the second circulation pump 11, a series circulation passage is connected between the first parallel circulation passage 102 and the second parallel circulation passage 202, and the reservoir tank 9 is disposed on the series circulation passage.

For example, the first parallel circulation passage 102 and the series circulation passage are connected in a branched manner at the rear end portion of the battery chiller 7 so that the coolant that has passed through the battery chiller 7 in the first cooling circuit 100 flows to the first circulation pump 1 or flows in the second cooling circuit 200.

Furthermore, the second parallel circulation passage 202 and the series circulation passage are connected in a branched manner at the rear end portion of the point where the heat pump 17 and the radiator 15 join so that the coolant that has passed through the heat pump 17 or the radiator 15 in the second cooling circuit 200 flows to the second circulation pump 11 or flows in the first cooling circuit 100.

Because the reservoir tank 9 is connected to the series circulation passage connecting the first cooling circuit 100 and the second cooling circuit 200, the reservoir tank 9 is always connected to the first and second cooling circuits 100 and 200.

The reservoir tank 9 may be disposed on a series circulation passage leading from the battery chiller 7 to the second circulation pump 11.

The series circulation passage includes a first series circulation passage 104 connected from the front end portion of the first parallel circulation passage 102 to the rear end portion of the second parallel circulation passage 202, and a second series circulation passage 204 connected from the front end portion of the second parallel circulation passage 202 to the rear end portion of the first parallel circulation passage 102. The reservoir tank 9 may be disposed on the first series circulation passage 104.

For example, the first parallel circulation passage 102 and the first series circulation passage 104 are branched at the rear end portion of the battery chiller 7, and the rear end portion of the branched first series circulation passage 104 joins the rear end portion of the second parallel circulation passage 202 at the front end portion of the second circulation pump 11.

Accordingly, the second parallel circulation passage 202 and the second series circulation passage 204 are branched at the rear end of the point where the heat pump 17 and the radiator 15 join, and the rear end of the branched second series circulation passage 204 joins the front end portion of the first parallel circulation passage 102 at the front end portion of the first circulation pump 1.

Accordingly, because the reservoir tank 9 is disposed on the first series circulation passage 104 of the first and second series circulation passages 104 and 204, air bubbles are removed from the cooling circuits through the reservoir tank 9.

Meanwhile, the present disclosure further includes a mode-switching valve 21 provided at the point where the coolant in the second cooling circuit 200 is branched into the second parallel circulation passage 202 and the series circulation passage for switching the direction of flow of the coolant, and a controller C configured to implement the independent cooling mode in which the coolant circulates independently in each of the first and second cooling circuits 100 and 200 and the integrated cooling mode in which the coolant circulates through both the first and second cooling circuits 100 and 200 by switching the mode-switching valve 21 depending on the outside temperature and the battery temperature.

For example, the mode-switching valve 21 may be a three-way valve. The mode-switching valve 21 is provided at a branching point into the second parallel circulation passage 202 and the second series circulation passage 204 as the reservoir tank 9 is disposed on the first series circulation passage 104, so that the coolant that has passed through the radiator 15 and the heat pump 17 circulates to the second parallel circulation passage 202 for implementation of the independent cooling mode or circulates to the second series circulation passage 204 for implementation of the integrated cooling mode.

The outside air temperature may be detected by an outside air temperature detector provided in a vehicle, but the outside air temperature may be replaced with a temperature detected by a water temperature detector 19 disposed at the front end portion of the mode-switching valve 21.

The battery temperature may be made by directly detecting the temperature of the battery 3. As an exemplary embodiment of the present disclosure, the battery temperature may be detected by a temperature detector disposed at the front or rear end portion of the battery 3.

The controller C causes the mode-switching valve 21 to open the second parallel circulation passage 202 and to close the series circulation passage when the outside air temperature and the battery temperature are equal to or greater than a predetermined temperature, implementing the independent cooling mode.

That is, when the weather is relatively hot, closing the port thereof on the second series circulation passage 204 by the mode-switching valve 21 allows the coolant to be cooled independently in each of the first and second cooling circuits 100 and 200.

Accordingly, in the first cooling circuit 100, the battery 3 is cooled by the battery chiller 7, and in the second cooling circuit 200, the PE module 13 is cooled by the radiator 15.

In the instant case, a heat exchange module switching valve 23 is disposed at the point where the coolant is branched into the radiator 15 and the heat pump 17 at the rear end portion of the PE module 13.

The heat exchange module switching valve 23 may be a three-way valve. The operation of the heat exchange module switching valve 23 enables the coolant that has passed through the PE module 13 to flow to the radiator 15 or to the heat pump 17.

The controller C causes the mode-switching valve 21 to close the second parallel circulation passage 202 and to open the series circulation passage when the outside air temperature is less than a predetermined temperature and the outside air temperature is less than the battery temperature, implementing the integrated cooling mode.

That is, when the weather is not relatively hot, operating the first circulation pump 1 and the second circulation pump 11 in a state in which the port thereof on the second parallel circulation passage 202 by the mode-switching valve 21 is closed, allows the coolant to be integrally cooled in both the first cooling circuit 100 and the second cooling circuit 200.

Accordingly, the PE module 13 and the battery 3 are cooled by the radiator 15 disposed in the second cooling circuit 200. However, although the coolant passes through the battery chiller 7 disposed in the first cooling circuit 100, the battery chiller 7 is controlled not to operate so as not to affect the cooling.

For reference, the controller C according to the exemplary embodiment of the present disclosure may be implemented through a processor configured to perform the operation described below using an algorithm configured to control the operation of various components of the vehicle or a non-volatile memory configured to store data relating to software instructions for reproducing the algorithm and data stored in that memory. Here, the memory and the processor may be implemented as separate chips. Alternatively, the memory and the processor may be implemented as a single chip integrated with each other. The processor may take the form of one or more processors.

Meanwhile, in the first cooling circuit 100 of the present disclosure, the first circulation pump 1, the battery 3, and the plurality of first heat exchange modules are mounted in series.

The first circulation pump 1 is disposed at the rear end of the point where the first parallel circulation passage 102 and the second series circulation passage 204 join, and the battery 3, the heater 5, and the battery chiller 7 are sequentially arranged.

At the rear end portion of the battery chiller 7, the first series circulation passage 104 on which the reservoir tank 9 is disposed is branched from the first parallel circulation passage 102.

In the second cooling circuit 200, the second circulation pump 11 and the PE module 13 are mounted in series, and the plurality of second heat exchange modules are arranged in parallel at the rear end portion of the PE module 13.

The second circulation pump 11 is disposed at the rear end portion of the point where the first series circulation passage 104 and the second parallel circulation passage 202 join, and the PE module 13 is disposed at the rear end portion of the second circulation pump 11.

The PE module 13 may be a motor, a converter, an inverter, or the like.

The heat exchange module switching valve 23 is disposed at the rear end portion of the PE module 13, and the passage is branched into a passage in which the radiator 15 is disposed and a passage in which the heat pump 17 is disposed at the heat exchange module switching valve 23.

The water temperature detector 19 is disposed at the rear end of the point where the passages in which the radiator 15 and the heat pump 17 join, and the mode-switching valve 21 is disposed at the rear end portion of the water temperature detector 19.

Hereinafter, the operation in which the cooling system according to an exemplary embodiment of the present disclosure implements the independent cooling mode and the integrated cooling mode will be described.

First, the operation of the independent cooling mode will be described with reference to FIG. 1. The outside air temperature and the battery temperature are monitored during the driving of the vehicle.

In the monitoring process, when the outside air temperature and the battery temperature are equal to or greater than a predetermined temperature, the mode-switching valve 21 is operated to open the port thereof on the second parallel circulation passage 202 and to close the port thereof on the second series circulation passage 204 toward the first cooling circuit 100.

At the same time, the heat exchange module switching valve 23 is operated to open the port thereof on the radiator 15 and to close the port thereof on the heat pump 17.

In the present state, the first and second circulation pumps 1 and 11 are operated so that in the first cooling circuit 100, the coolant that has passed through the battery chiller 7 circulates only in the first cooling circuit 100 while flowing to the first parallel circulation passage 102. Thus, in the coolant circulation process, the battery 3 is cooled by the battery chiller 7.

In the second cooling circuit 200, the coolant that has passed through the radiator 15 circulates only in the second cooling circuit 200 while flowing to the second parallel circulation passage 202. Thus, in the coolant circulation process, the PE module 13 is cooled by the radiator 15. Accordingly, the independent cooling mode of the first and second cooling circuits 100 and 200 is implemented.

In a process of independent cooling, the coolant flows around the individual cooling loop in each of the first and second cooling circuits 100 and 200, but the air in the coolant flows to the reservoir tank 9 through the first series circulation passage 104.

Accordingly, the air is collected in the reservoir tank 9 in a process of independent cooling, facilitating the air to be removed from the cooling circuit.

Next, the operation of the integrated cooling mode will be described with reference to FIG. 2. The outside air temperature and the battery temperature are monitored during the driving of the vehicle.

In the monitoring process, when the outside air temperature is less than a predetermined temperature and the outside air temperature is less than the battery temperature, the mode-switching valve 21 is operated to close the port thereof on the second parallel circulation passage 202 and to open the port thereof on the second series circulation passage 204 toward the first cooling circuit 100.

At the same time, the heat exchange module switching valve 23 is operated to open the port thereof on the radiator 15 and to close the port thereof on the heat pump 17.

In the present state, the first circulation pump 1 and/or the second circulation pump 11 are operated, so that the coolant that has passed through the battery chiller 7 in the first cooling circuit 100 flows toward the PE module 13 in the second cooling circuit 200 through the reservoir tank 9.

In the second cooling circuit 200, the coolant that has passed through the radiator 15 flows toward the battery 3 in the first cooling circuit 100.

Accordingly, in the coolant circulation process, the PE module 13 and the battery 3 are cooled by the radiator 15. Accordingly, the integrated cooling mode of the first and second cooling circuits 100 and 200 is implemented.

Because the coolant passes through the reservoir tank 9 in a process of integrated cooling, the air is collected in the reservoir tank 9 during coolant circulation, facilitating the air to be removed from the cooling circuit.

As described above, because the reservoir tank 9 is always connected to the first and second cooling circuits 100 and 200 in an exemplary embodiment of the present disclosure, air may be removed from each cooling circuit during coolant circulation in the integrated cooling mode as well as during coolant circulation in the independent cooling mode. Therefore, it is possible to significantly improve air removal efficiency through constant removal of air regardless of the cooling mode.

As is apparent from the above description, because the reservoir tank is always connected to the first and second cooling circuits in an exemplary embodiment of the present disclosure, air may be removed from each cooling circuit during coolant circulation in the integrated cooling mode as well as during coolant circulation in the independent cooling mode. Therefore, it is possible to cleaning air removal efficiency through constant removal of air regardless of the cooling mode.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A cooling system for a vehicle, the cooling system comprising:
    a first cooling circuit configured to cool a battery by coolant that circulates in accordance with operation of a first circulation pump and exchanges heat with a first heat exchange module;
    a second cooling circuit configured to cool a power electronic (PE) module by coolant that circulates in accordance with operation of a second circulation pump and exchanges heat with a second heat exchange module, the second cooling circuit being configured so that the coolant in the first cooling circuit circulates through the second cooling circuit; and
    a reservoir tank, which is continuously connected to the first and second cooling circuits to remove air in the coolant flowing through each of the first and second cooling circuits in the reservoir tank; and
    a first parallel circulation passage connected between a rear end portion of the first heat exchange module and a front end portion of the first circulation pump;
    a second parallel circulation passage connected between a rear end portion of the second heat exchange module and a front end portion of the second circulation pump; and
    a series circulation passage connected between the first parallel circulation passage and the second parallel circulation passage,
    wherein the reservoir tank is disposed on the series circulation passage.

2. The cooling system of claim 1, wherein the reservoir tank is connected between the first cooling circuit and the second cooling circuit.

3. The cooling system of claim 1,
    wherein the series circulation passage includes:
        a first series circulation passage connected from a front end portion of the first parallel circulation passage to a rear end portion of the second parallel circulation passage; and
        a second series circulation passage connected from a front end portion of the second parallel circulation passage to a rear end portion of the first parallel circulation passage, and
    wherein the reservoir tank is disposed on the first series circulation passage.

4. The cooling system of claim 1, further including:
    a mode-switching valve provided at a point where the coolant in the second cooling circuit is branched into the second parallel circulation passage and the series circulation passage for switching a direction of flow of the coolant; and
    a controller configured to implement an independent cooling mode in which the coolant circulates independently in each of the first and second cooling circuits and an integrated cooling mode in which the coolant circulates in the first and second cooling circuits by switching the mode-switching valve depending on an outside air temperature and a battery temperature.

5. The cooling system of claim 4, wherein when the outside air temperature and the battery temperature are equal to or greater than a predetermined temperature, the controller is configured to control the mode-switching valve so that the mode-switching valve opens the second parallel circulation passage and closes the series circulation passage to implement the independent cooling mode.

6. The cooling system of claim 5,
    wherein the second heat exchange module includes a heat pump and a radiator,
    wherein the cooling system further includes a heat exchange module switching valve disposed at a point where the coolant is branched into the radiator and the heat pump at a rear end portion of the PE module, and
    wherein the controller is configured to control the heat exchange module switching valve to open a first port thereof on the radiator and to close a second port thereof on the heat pump.

7. The cooling system of claim 4, wherein when the outside air temperature is less than a predetermined temperature and the outside air temperature is less than the battery temperature, the controller is configured to control the mode-switching valve so that the mode-switching valve closes the second parallel circulation passage and opens the series circulation passage to implement the integrated cooling mode.

8. The cooling system of claim 7, further including:
    wherein the second heat exchange module includes a heat pump and a radiator,
    wherein the cooling system further includes a heat exchange module switching valve disposed at a point where the coolant is branched into the radiator and the heat pump at a rear end portion of the PE module, and
    wherein the controller is configured to control the heat exchange module switching valve to open a first port thereof on the radiator and to close a second port thereof on the heat pump.

9. The cooling system of claim 1,
    wherein the second heat exchange module includes a heat pump and a radiator, and
    wherein the cooling system further includes:
        a heat exchange module switching valve disposed at a point where the coolant is branched into the radiator and the heat pump at a rear end portion of the PE module, wherein the heat exchange module switching valve is configured to enable the coolant that has passed through the PE module to flow to the radiator or to the heat pump; and
        a controller configured to control a mode-switching valve to close the second parallel circulation passage and to open the series circulation passage when an outside air temperature is less than a predetermined temperature and the outside air temperature is less than a battery temperature.

10. The cooling system of claim 1,
    wherein in the first cooling circuit, the first circulation pump, the battery, and
    wherein the first heat exchange module is provided in plural, and the provided first heat exchange modules are mounted in series.

11. The cooling system of claim 1,
    wherein in the second cooling circuit, the second circulation pump and the PE module are mounted in series, and
    wherein the second heat exchange module is provided in plural, and the provided second heat exchange modules are arranged in parallel at a rear end portion of the PE module.

* * * * *